US005319995A

United States Patent [19]
Huang

[11] Patent Number: 5,319,995
[45] Date of Patent: Jun. 14, 1994

[54] HANDLE ASSEMBLY FOR A BICYCLE HANDLEBAR

[76] Inventor: Yeong-Chien Huang, No. 347, Sec. 2, Chung-Cheng Rd., Chang-Hua City, Taiwan

[21] Appl. No.: 122,021

[22] Filed: Sep. 15, 1993

[51] Int. Cl.$^5$ ............................................ B62K 23/00
[52] U.S. Cl. .................... 74/551.8; 74/551.1; 74/551.3; 280/279; 403/90; 403/88
[58] Field of Search ........................ 74/551.1–551.8; 280/279, 280, 281.1; 403/88, 90

[56] References Cited

U.S. PATENT DOCUMENTS

| | | | |
|---|---|---|---|
| 4,479,646 | 10/1984 | Chirpozu | 74/551.8 |
| 5,033,325 | 7/1991 | Giard | 74/551.3 |
| 5,133,568 | 7/1992 | Balterman | 74/551.8 X |
| 5,154,095 | 10/1992 | Giard | 74/551.8 |
| 5,197,350 | 3/1993 | Borromeo | 74/551.8 |
| 5,201,243 | 4/1993 | Schneider | 74/551.1 |
| 5,224,396 | 7/1993 | Lobbezoo et al. | 403/90 X |
| 5,247,852 | 9/1993 | Guerr | 403/88 X |

FOREIGN PATENT DOCUMENTS 0053667 6/1982 European Pat. Off. ............ 74/551.1

*Primary Examiner*—Vinh T. Luong
*Attorney, Agent, or Firm*—Curtis, Morris & Safford

[57] ABSTRACT

A handle assembly is to be mounted detachably on one end of a bicycle handlebar and includes a resilient sleeve member that is sleeved on the bicycle handlebar, an integrally formed handle unit that is made of a composite plastic material, and a bolt unit. The integrally formed handle unit has a clamping portion and a handle portion that extends upwardly from the clamping portion. The handle portion has a generally vertical section that extends from the clamping portion, and a generally horizontal section that extends from a distal end of the vertical section. The vertical section of the handle portion is formed with at least one longitudinally extending reinforcing strip that is connected to the clamping portion. The clamping portion has a generally C-shaped section that confines a through-hole and that is sleeved on the first resilient sleeve member. The clamping portion further has two spaced-apart locking plates which extend from the generally C-shaped section and which cooperatively define a gap therebetween. The gap is communicated with the through-hole of the C-shaped section. The bolt unit fastens together the two locking plates so that the C-shaped section is in tight contact with the resilient sleeve member in order to prevent rotation and longitudinal movement of the clamping portion relative to the bicycle handlebar.

3 Claims, 4 Drawing Sheets

HANDLE ASSEMBLY FOR A BICYCLE HANDLEBAR

BACKGROUND OF THE INVENTION

1. Field of the Invention

This invention relates to a handle for a bicycle handlebar, more particularly to a handle assembly which is mounted detachably on one end of a bicycle handlebar and which has a vibration absorbing effect.

2. Description of the Related Art

Conventionally, a bicycle is only provided with a handlebar at the front of the bicycle frame. In recent years, a handle is secured at each of the two end portions of the handlebar. The location of each handle on the handlebar and the angle formed between each handle and the handlebar can be adjusted so that the user can grip the handlebar or the handles in accordance with his wishes.

A conventional handle 1 is shown in FIG. 1. The conventional handle 1 is made from a chromium molybdenum steel tube, a aluminum alloy tube, a metal tube, etc. The conventional handle 1 comprises a clamping member 2 and a handle member 3 that extends upwardly from the clamping member 2. The clamping member 2 is shaped in the form of a hollow tube which has an inner surface that confines a through-hole (2a) and which is sleeved on the bicycle handlebar (partly shown in phantom lines). The inner surface of the clamping member 2 is rolled to form anti-slip knurls (2b) thereon. The clamping member 2 is formed with an axially extending slit (2c). Two lugs (2d) protrude from the clamping member 2 on two sides of the slit (2c). A locking bolt (2e) extends through the two lugs (2d) to fasten together the two lugs (2d) so that the anti-slip knurls (2b) on the inner surface of the clamping member 2 are in tight contact with the bicycle handlebar in order to prevent rotation and longitudinal movement of the clamping member 2 relative to the bicycle handlebar. The handle member 3 is welded to the clamping member 2 and has an open upper end (3a) which is sealed by a stopper (3b).

The above-described conventional handle 1 has the following drawbacks:

1. Since the clamping member 2 and the handle member 3 are welded together, a pass is formed at the junction of the clamping member 2 and the handle member 3. A painting process is required to trim the pass, thereby increasing the manufacturing costs.

2. The handle 1 is made of a metallic material and is incapable of absorbing the resulting vibrations when the bicycle is in use, thereby resulting in discomfort to the user.

3. Rolling the inner surface of the clamping member 2 with anti-slip knurls (2b) is time-consuming and complicates the manufacture of the handle 1. Furthermore, when the inner surface of the clamping member 2 is in tight contact with the bicycle handlebar, scraping of the paint off the bicycle handlebar usually occurs.

4. The open upper end (3a) of the handle member 3 is sealed with a stopper (3b) to prevent the accumulation of water in the handle 1, thereby further increasing the cost of the handle 1. Furthermore, the stopper (3b) disengages easily from the handle member 3 after a period of time.

SUMMARY OF THE INVENTION

Therefore, the main object of the present invention is to provide a handle assembly which is mounted detachably on a bicycle handlebar and which is integrally formed of a composite plastic material so as to provide the handle assembly with a shock absorbing effect.

A second object of the present invention is to provide a handle assembly that is relatively easy to manufacture, thereby reducing the manufacturing costs involved.

Accordingly, the handle assembly of the present invention is to be mounted detachably on one end of a bicycle handlebar and includes a first resilient sleeve member, an integrally formed handle unit and a bolt unit. The first resilient sleeve member is sleeved on the bicycle handlebar. The integrally formed handle unit is made of a composite plastic material and has a clamping portion and a handle portion which extends upwardly from the clamping portion. The handle portion has a generally vertical section that extends from the clamping portion, and a generally horizontal section that extends from a distal end of the vertical section. The vertical section of the handle portion is formed with at least one longitudinally extending reinforcing strip that is connected to the clamping portion. The clamping portion has a generally C-shaped section that confines a through-hole and that is sleeved on the first resilient sleeve member. The clamping portion further has two spaced-apart locking plates which extend from the generally C-shaped section and which cooperatively define a gap therebetween. The gap is communicated with the through-hole of the C-shaped section. The bolt unit fastens together the two locking plates so that the C-shaped section is in tight contact with the first resilient sleeve member in order to prevent rotation and longitudinal movement of the clamping portion relative to the bicycle handlebar.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
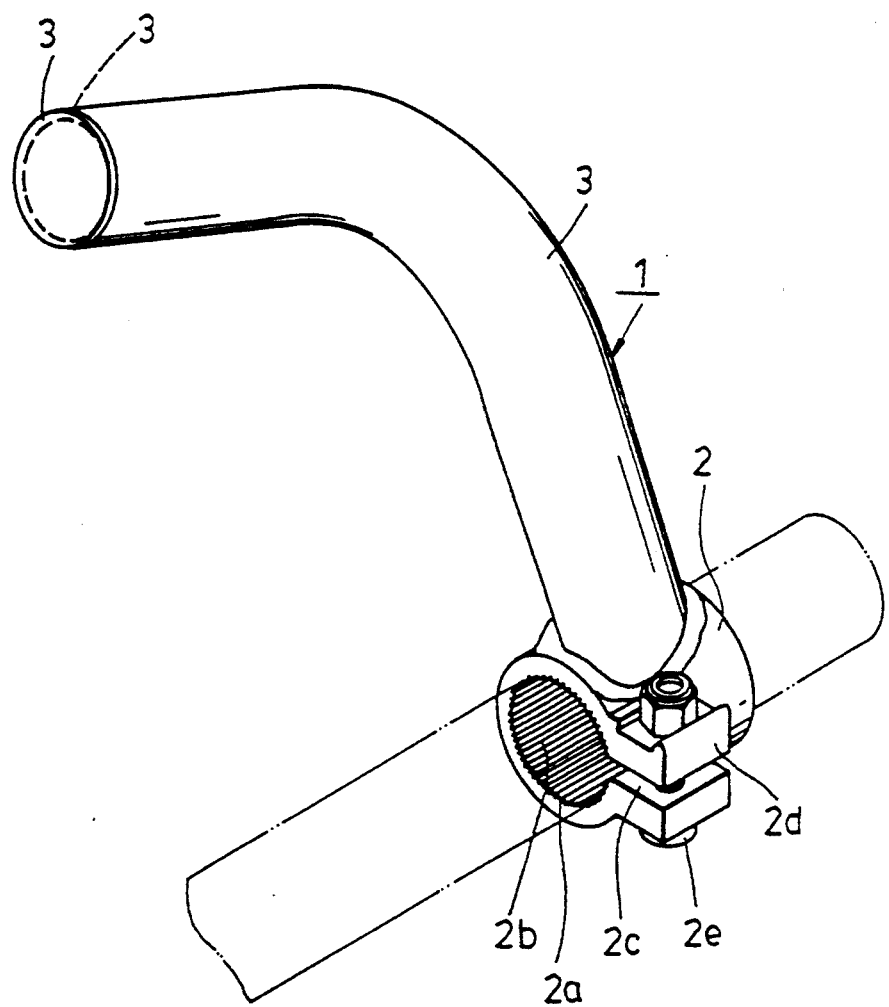
FIG. 1 is a perspective view of a conventional handle for a bicycle handlebar.
Figure 2:
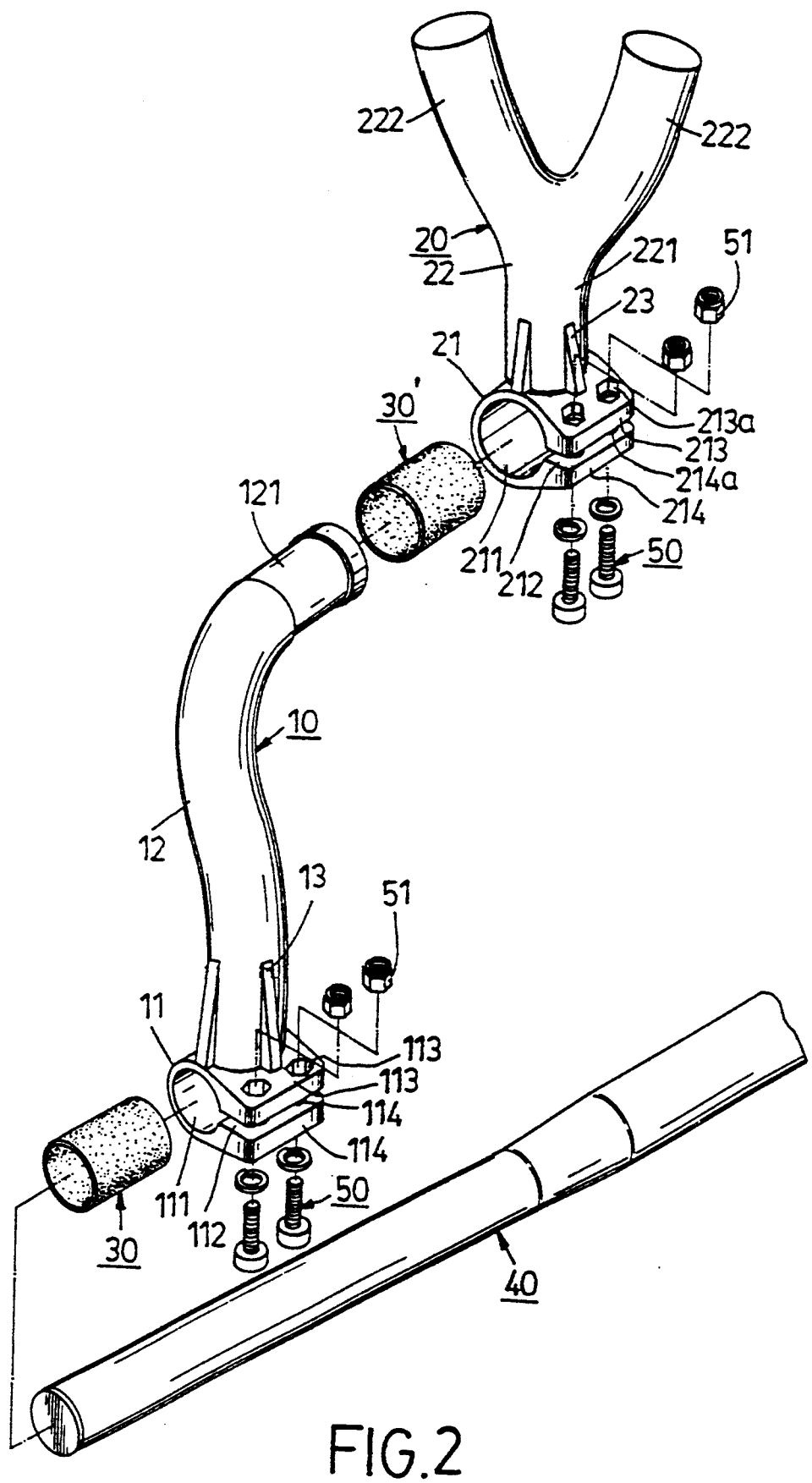
FIG. 2 is a exploded view showing a handle assembly according present invention.
Figure 4:
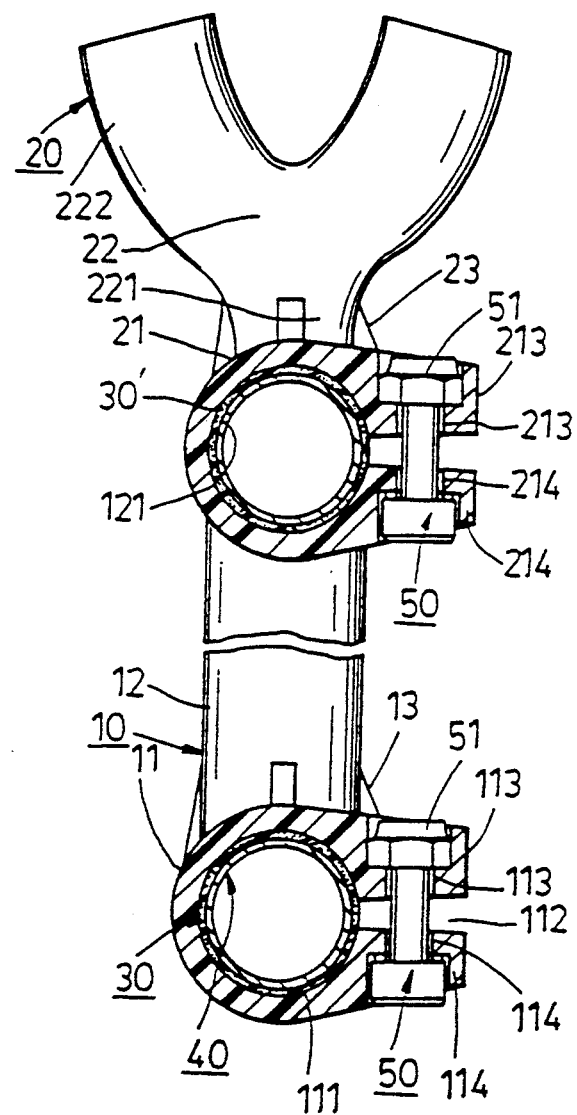
FIG. 4 is a sectional view showing the assembly of the handle assembly according to the present invention.

Referring to FIGS. 2 and 4, a handle assembly is to be mounted detachably on one end of a bicycle handlebar and includes first and second resilient sleeve members 30, 30', an integrally formed handle unit 10, an integrally formed support unit 20 and two bolt units.

The first resilient sleeve member 30 is sleeved on one end of the bicycle handlebar 40.

The integrally formed handle unit 10 is made of a composite plastic material and has a clamping portion 11 and a handle portion 12 that extends upwardly from the clamping portion 11. The handle portion 12 has a generally vertical section that extends from the clamping portion 11, and a generally horizontal section that extends from a distal end of the vertical section. The horizontal section of the handle portion 12 is formed with an annular peripheral groove 121. The vertical section of the handle portion 12 is formed with a plurality of longitudinally extending reinforcing strips 13 that are connected to the clamping portion 11. The clamping portion 11 has a generally C-shaped section that confines a through-hole 111 and that is sleeved on the first resilient sleeve member 30. The clamping portion 11 further has two spaced-apart locking plates 113, 114 which extend from the generally C-shaped section and which cooperatively define a gap 112 therebetween. Each of the locking plates 113, 114 has two locking holes (113a, 114a) formed therein. The gap 112 is communicated with the through-hole 111 of the C-shaped section.

Each of the bolt units includes two locking bolts 50 and two nuts 51. The two locking bolts 50 of one of the bolt units extend through the locking holes (113a, 114a) in the locking plates 113, 114 and engage the nuts 51 so as to fasten the two locking plates 113, 114 together in order to permit tight contact between the C-shaped section and the first resilient sleeve member 30 to prevent rotation and longitudinal movement of the clamping portion 11 relative to the bicycle handlebar 40.

The second resilient sleeve member 30' is sleeved on the horizontal section of the handle portion 12 in the annular peripheral groove 121.

The integrally formed support unit 20 is made of a composite plastic material and has a clamping portion 21 and a generally Y-shaped support portion 22. The support portion 22 has a forked head section which is provided with two prong members 222, and an upright neck section 21 which extends upwardly from the clamping portion 21 of the support unit 20 and which is formed with a plurality of longitudinally extending reinforcing strips 23 that are connected to the clamping portion 21 of the support unit 20 The clamping portion 21 of the support unit 20 has a generally C-shaped section that confines a through-hole 211 and that is sleeved on the second resilient sleeve member 30'. The clamping portion 21 of the support unit 20 further has two spaced-apart locking plates 213, 214 which extend from the generally C-shaped section and which cooperatively define a gap 212 therebetween. Each of the locking plates 213, 214 is formed with two locking holes (213a, 214a). The gap 212 is communicated with the through-hole 211 of the C-shaped section. The two locking bolts 50 of another one of the bolt units extend through the locking holes (213a, 214a) in the locking plates 213, 214 and engage the nuts 51 so as to fasten the two locking plates 213, 214 together in order to permit tight contact between the C-shaped section and the second resilient sleeve member 30' to prevent rotation and longitudinal movement of the clamping portion 21 relative to the horizontal section of the handle portion 12 of the handle unit 10.

Figure 3:
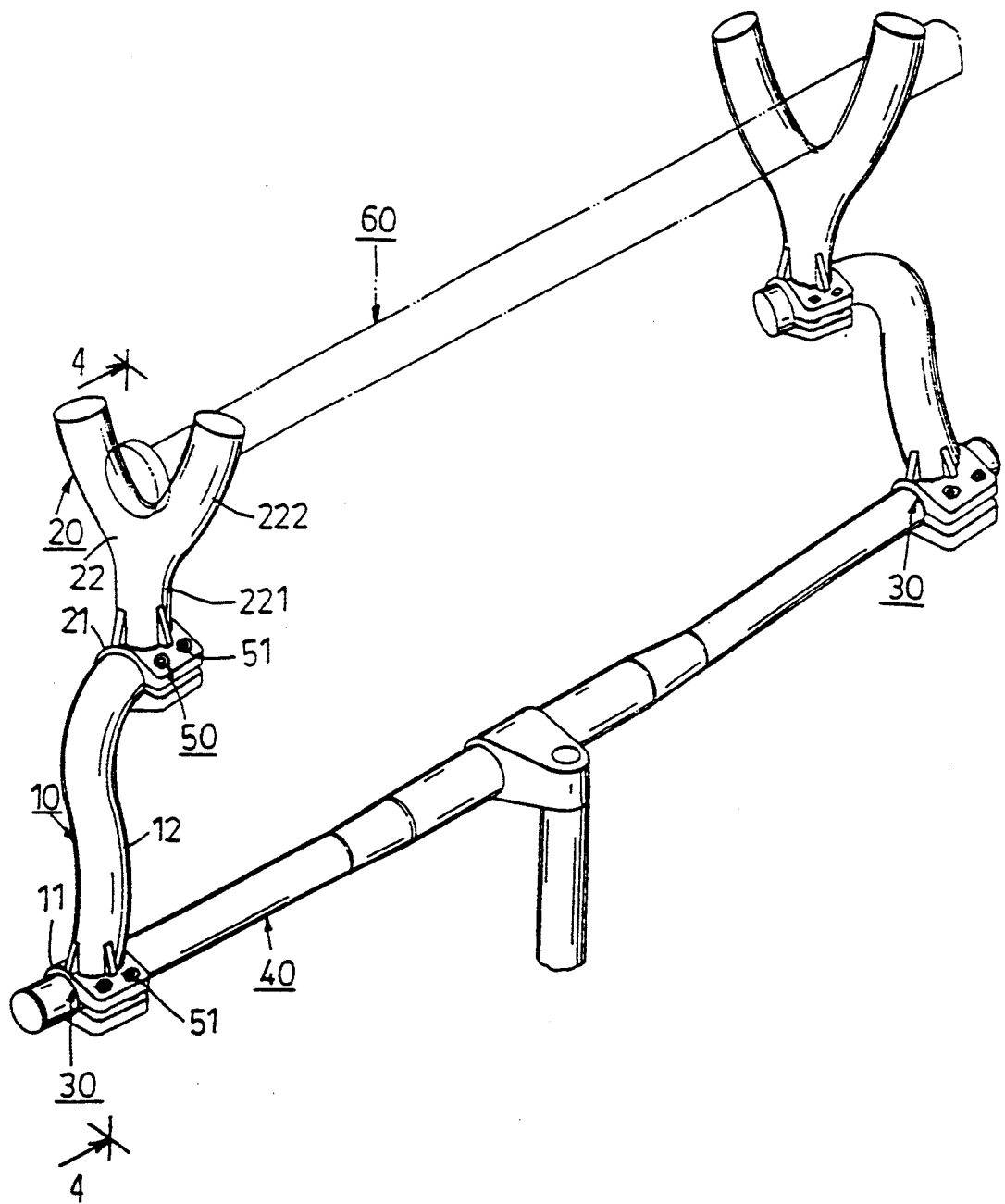
FIG. 3 is a perspective view showing two handle assemblies mounted detachably on two ends of the bicycle handlebar.

Referring now to FIG. 3, two handle assemblies are mounted detachably on two ends of the bicycle handlebar 40. The location of each handle assembly and the angle formed between each handle assembly and the handlebar can be adjusted in accordance with the user's wishes. Furthermore, if the user carries an elongated equipment 60, such as a fishing rod, a bat, a racket, etc., the equipment 60 can be supported on the forked head sections of the support units 20. This facilitates bringing along of the equipment 60 while riding the bicycle. On the other hand, the support unit 20 can be selectively removed from the handle portion 12 of the handle unit 10.

Accordingly, the use of an integrally formed handle unit 10 that is made of a composite plastic material and the use of a resilient sleeve member 30 simplify the manufacture of the handle assembly. In addition, the handle assembly has a shock absorbing effect due to the provision of the integrally formed handle unit 10 which is made of a composite plastic material.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A handle assembly mounted detachably on one end of a bicycle handlebar, said handle assembly comprising:

a first resilient sleeve member sleeved on said bicycle handlebar;

an integrally formed handle unit which is made of a composite plastic material and which has a clamping portion and a handle portion extending upwardly from said clamping portion, said handle portion having a generally vertical section extending from said clamping portion, and a generally horizontal section extending from a distal end of said vertical section, said vertical section of said handle portion being formed with at least one longitudinally extending reinforcing strip that is connected to said clamping portion said clamping portion having a generally C-shaped section that confines a through-hole and that is sleeved on said first resilient sleeve member, said clamping portion further having two spaced-apart locking plates which extend from said generally C-shaped section and which cooperatively define a gap therebetween, said gap being communicated with said through-hole of said C-shaped section; and a bolt unit for fastening together said two locking plates so that said C-shaped section is in tight contact with said first resilient sleeve member in order to prevent rotation and longitudinal movement of said clamping portion relative to said bicycle handlebar.

2. A handle assembly as claimed in claim 1, wherein said horizontal section of said handle portion is formed with an annular peripheral groove, said handle assembly further comprising a second resilient sleeve member sleeved on said horizontal section of said handle portion in said annular peripheral groove, and an integrally formed support unit which is made of a composite plastic material and which has a clamping portion, said clamping portion of said support unit having a generally C-shaped section that confines a through-hole and that is sleeved on said second resilient sleeve member, said clamping portion of said support unit further having two spaced-apart locking plates which extend from said generally C-shaped section and which cooperatively define a gap therebetween, said gap being communicated with said through-hole of said C-shaped section, said handle assembly further having a bolt unit for fastening together said two locking plates so that said C-shaped section is in tight contact with said second resilient sleeve member in order to prevent rotation and longitudinal movement of said clamping portion of said support unit relative to said horizontal section of said handle portion of said handle unit.

3. A handle assembly as claimed in claim 2, wherein said integrally formed support unit further has a generally Y-shaped support portion which has a forked head section and an upright neck section that extends upwardly from said clamping portion of said support unit and that is formed with at least one longitudinally extending reinforcing strip connected to said clamping portion of said support unit.

* * * * *